United States Patent [19]
LeVey

[11] Patent Number: 6,045,309
[45] Date of Patent: Apr. 4, 2000

[54] TWO-PIECE RIVET WITH PRE-DRIVEN CONFIGURATION

[75] Inventor: Kenneth LeVey, West Chicago, Ill.

[73] Assignee: Illinois Tool Works Inc., Glenview, Ill.

[21] Appl. No.: 09/172,331

[22] Filed: Oct. 14, 1998

[51] Int. Cl.$^7$ .................................................. F16B 13/06
[52] U.S. Cl. ............................................. 411/45; 411/349
[58] Field of Search .......................... 411/40, 41, 45–49, 411/57.1, 59, 349, 553, 15

[56] References Cited

U.S. PATENT DOCUMENTS

| | | |
|---|---|---|
| Re. 33,809 | 1/1992 | Okada et al. . |
| 2,487,084 | 11/1949 | Weiss . |
| 3,460,209 | 8/1969 | Modrey . |
| 3,466,966 | 9/1969 | Brown . |
| 3,718,950 | 3/1973 | Engstrom . |
| 3,964,364 | 6/1976 | Poe .......................................... 411/349 |
| 4,007,516 | 2/1977 | Coules ..................................... 411/349 |
| 4,085,651 | 4/1978 | Koscik ...................................... 411/41 |
| 4,222,304 | 9/1980 | Yoshida et al. . |
| 4,238,446 | 12/1980 | Tanaka . |
| 4,391,559 | 7/1983 | Mizusawa . |
| 4,405,272 | 9/1983 | Wollar . |
| 4,610,587 | 9/1986 | Wollar ....................................... 411/45 |
| 4,637,765 | 1/1987 | Omata . |
| 4,647,262 | 3/1987 | Yokota ..................................... 411/349 |
| 4,674,930 | 6/1987 | Poe et al. . |
| 5,030,051 | 7/1991 | Kaneko et al. . |
| 5,211,519 | 5/1993 | Saito ........................................ 411/45 |

FOREIGN PATENT DOCUMENTS

| | | | |
|---|---|---|---|
| 459994 | 5/1928 | Germany .............................. 411/57.1 |

*Primary Examiner*—Flemming Saether
*Attorney, Agent, or Firm*—Pitney, Hardin, Kipp and Szuch LLP

[57] ABSTRACT

The rivet includes a rivet body and a rivet shaft. The rivet shaft includes a shank with a head and an oval boss at opposite ends of the shank. The rivet body includes a circular flange with expandable arms extending therefrom with an oval aperture therebetween. The oval boss passes through the oval aperture and into cam grooves on the inner surface of the expandable arms. The oval boss, with its major axis positioned between the expandable arms, expands the arms apart into an installed position without the need for rotating the shaft subsequent to insertion. By turning the shaft one quarter turn after reaching the installed position, the minor axis of the oval boss is positioned between the expandable arms and the arms collapse to the uninstalled position. Additionally, complementary ramps and sheer faces on the lower surface of the head an within the countersunk nest surrounding the oval aperture inhibit relative clockwise rotation of the head in the installed position and urge the head upwardly from the flange in the uninstalled position.

17 Claims, 4 Drawing Sheets

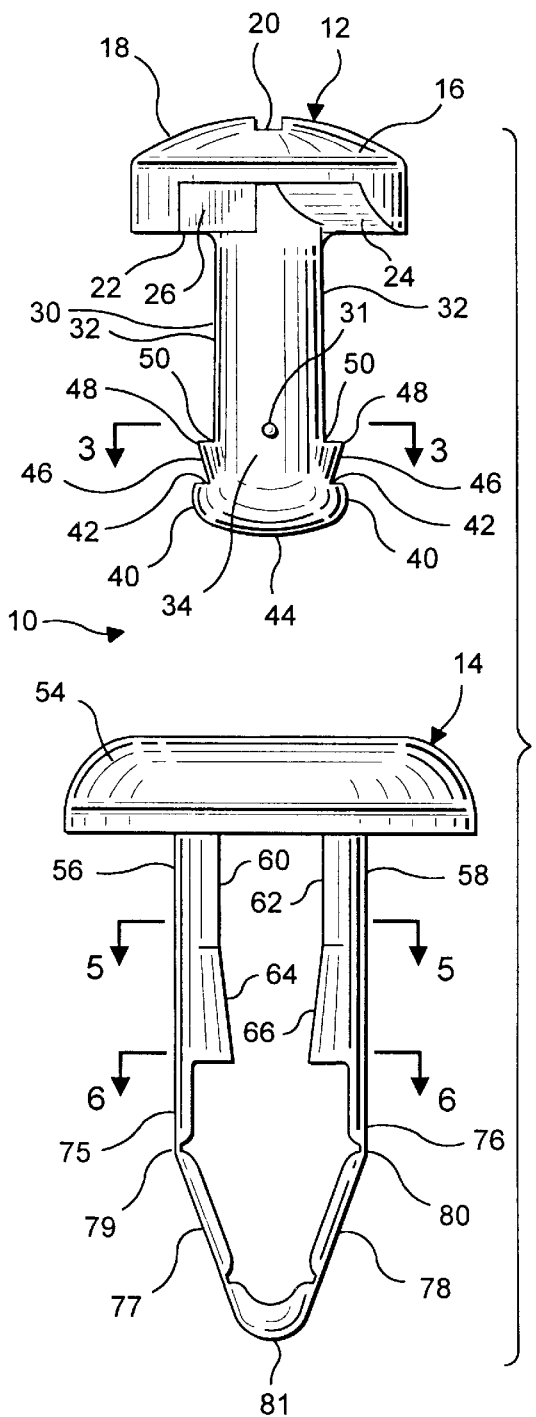
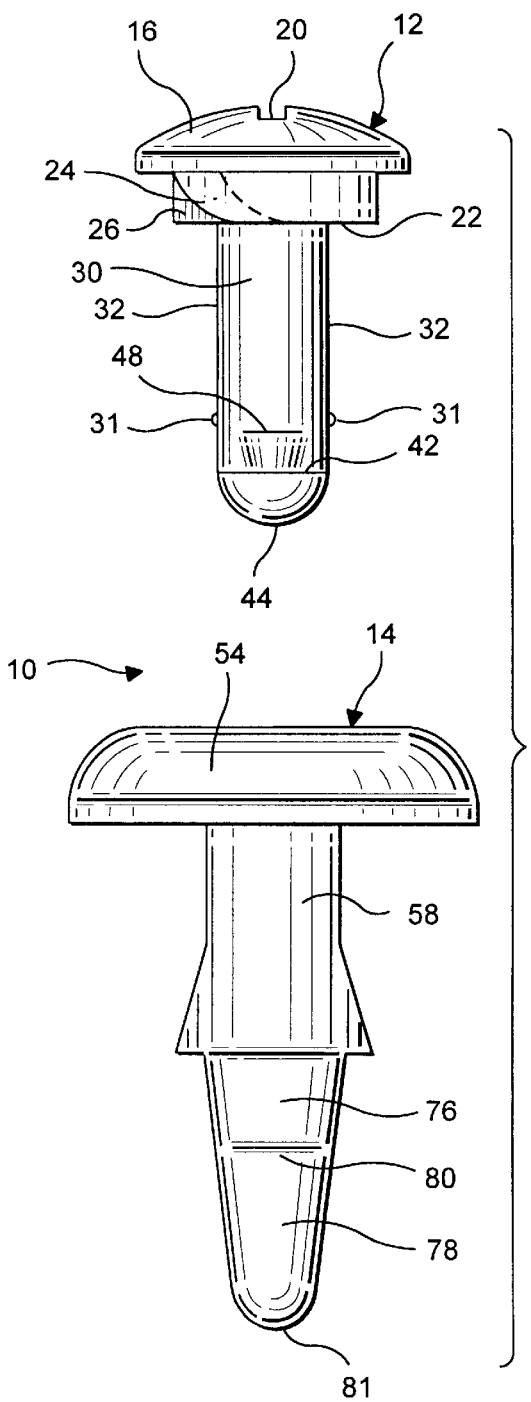
FIG. 1
FIG. 2

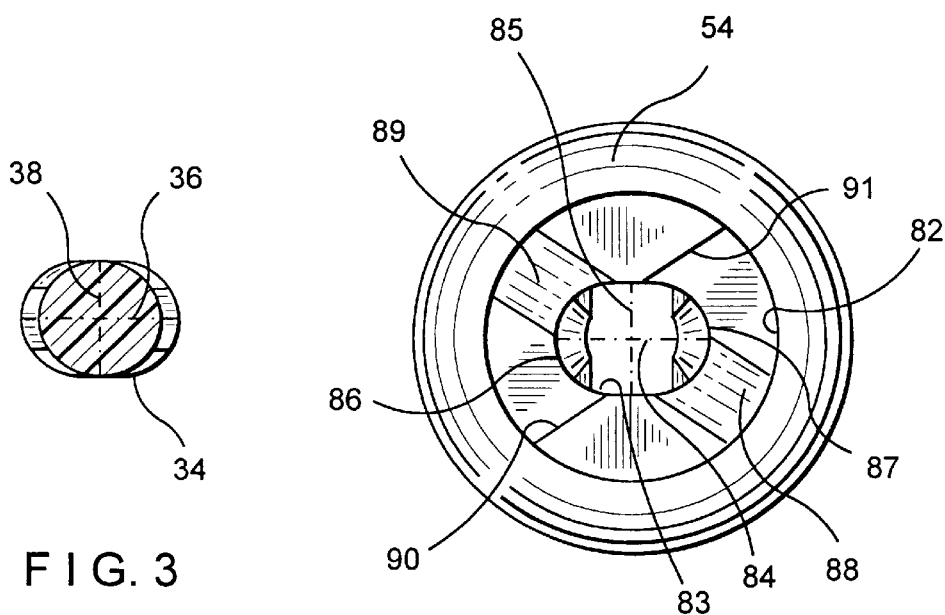
FIG. 3
FIG. 4
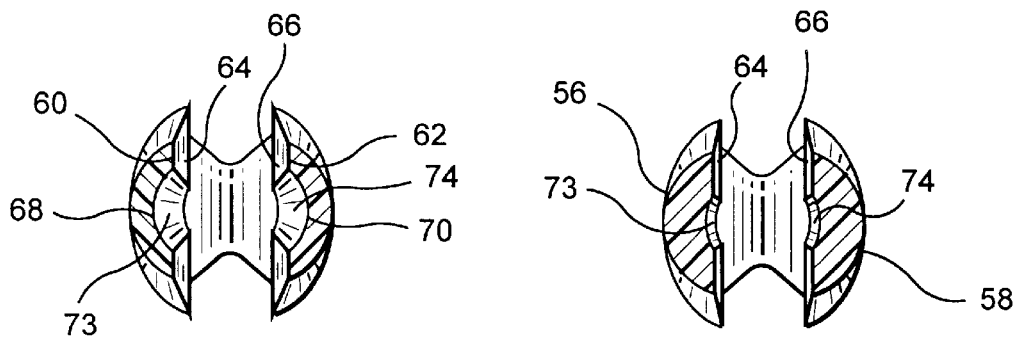
FIG. 5
FIG. 6
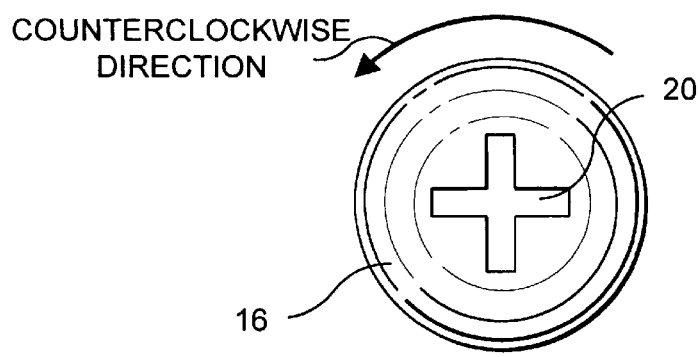
FIG. 7

TWO-PIECE RIVET WITH PRE-DRIVEN CONFIGURATION

BACKGROUND OF THE INVENTION

1. Field of the Invention

This invention pertains to a two-piece plastic rivet which can be serviced in that it can be repeatedly connected and disconnected using manual action and a screwdriver.

2. Description of the Prior Art

Two-piece rivet configurations are known in the prior art. These rivet configurations have typically not been adapted to simple and intuitive connection and disconnection, particularly repeated connection and disconnection. An example of such a prior art rivet is U.S. Pat. No. 4,405,272 entitled "Two-Piece Fastener with Front Shoulder", issued on Sep. 20, 1983 to Wallor. Additionally, many prior art devices have included threaded configurations which require the installer to spend a prolonged period of time with a tool repeatedly turning a piece of the rivet. Many prior art devices have required specialized tools for servicing subsequent to installation and have been not simple and intuitive to service. Similarly, many prior art fasteners have not provided for disengagement or disconnection, particularly repeated disengagement or disconnection.

Many prior art fasteners have had complicated designs with many assembled components. This contributes to increased manufacturing costs and increased difficulty in packaging, transportation and assembly.

OBJECTS AND SUMMARY OF THE INVENTION

It is therefore an object of this invention to provide a fastener which is adapted to simple and intuitive connection and disconnection.

It is therefore a further object of this invention to provide a fastener which is adapted to quick connection and disconnection.

It is therefore a still further object of this invention to provide a fastener which is adapted to repeated connection and disconnection.

It is therefore a still further object of this invention to provide a fastener which can be installed with minimal or no tools.

It is therefore a still further object of this invention to provide a fastener which can be disconnected with standard or non-specialized tools.

It is therefore a still further object of this invention to provide a fastener which can be shipped as a single assembly.

It is therefore a still further object of this invention to provide a fastener which can retain a one-piece structure after servicing.

It is therefore a still further object of this invention to provide a fastener which has a minimal number of component parts.

It is therefore a still further object of this invention to provide a fastener with reduced costs of manufacture, packaging and transportation.

These and other objects are attained by a rivet with a rivet shaft and an expandable rivet body. The rivet shaft includes a head on one end and an oval boss on the other end, separated by a shank. The oval boss fits through an oval aperture of the rivet body. When the rivet shaft and rivet body are separate, the oval boss of the rivet shaft can be aligned with oval aperture and the rivet shaft can be manually forced into the rivet body. The oval boss acts as a cam to spread the arms of the expandable rivet body apart. Undercuts in the rivet shank engage the arms in a fully locked position thereby completing the installation process without the use of tools.

To disconnect the rivet during servicing, the user uses a screwdriver to engage a screw-type configuration (such as "Phillips head") on the head of the shaft to turn the shaft ninety degrees (i.e., one-quarter turn) counterclockwise. This causes the undercuts in the rivet shank and the oval boss to disengage from the arms of the rivet body. This causes the arms to collapse or contract to the uninstalled position, thereby forcing the rivet shaft slightly upward so that the head protrudes somewhat from the rivet body thereby intuitively indicating that the rivet is not in a connected configuration. However, in this position, as the oval boss of the rivet shaft is not aligned with the oval aperture of the oval aperture of the rivet body, the rivet shaft cannot be withdrawn from the rivet body. Thereafter, a screwdriver can be used to urge the shaft back into the rivet body, and turn the shaft the one quarter turn necessary for re-connection.

Both the underside of the rivet head and the nest portion of the rivet body immediately outwardly adjacent from the oval aperture include complementary ramps and sheer walls to urge the head upward during counterclockwise rotation of the head and, when the sheer walls of the head engage complementary sheer walls of the body, to inhibit relative clockwise rotation of the head with respect to the body. Additionally, when the rivet head is urged toward the rivet body during rotation, the complementary ramps provide counterrotation of the rivet body.

BRIEF DESCRIPTION OF THE DRAWINGS

Further objects and advantages of the invention will become apparent from the following description and claims, and from the accompanying drawings, wherein:

FIG. 1 is an exploded side view of the rivet of the present invention.

FIG. 2 is an exploded side view of the rivet of the present invention, rotated ninety degrees from FIG. 1.

FIG. 3 is a cross-sectional view along plane 3—3 of FIG. 1, showing the cross section of the oval boss of the shaft of the rivet of the present invention.

FIG. 4 is a top plan view of the body of the rivet of the present invention, showing the ramps, sheer faces and oval aperture of the nest of the body.

FIG. 5 is a cross-sectional view along plane 5—5 of FIG. 1, showing the cross section of the arms of the body of the rivet of the present invention.

FIG. 6 is a cross-sectional view along plane 6—6 of FIG. 1, showing the cross section of a lower portion of the arms of the body of rivet of the present invention.

FIG. 7 is a top plan view of the rivet of the present invention.

DETAILED DESCRIPTION OF THE PREFERRED EMBODIMENT

Figures 8, 9:
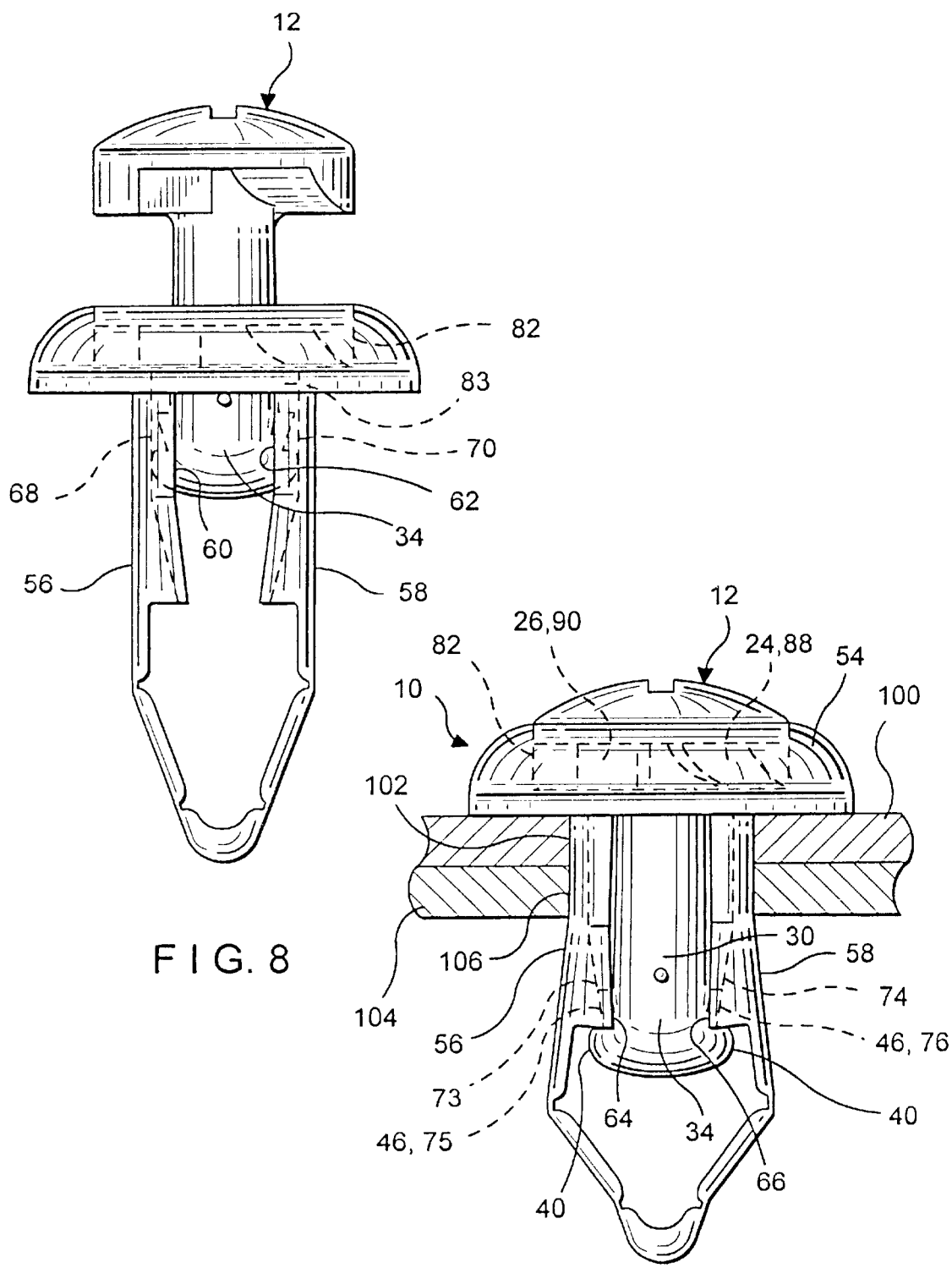
FIG. 8 is a side plan view of the rivet of the present invention, in the pre-driven state with the shaft partially inserted immediately prior to the manual installation of the rivet.
FIG. 9 is a side plan view of the rivet of the present invention in the installed position, with the shaft completely inserted into the body.

Referring now to the drawings in detail wherein like numerals refer to like elements throughout the several views, one sees that FIG. 1 is an exploded view of rivet 10. Rivet 10 includes rivet shaft 12 and rivet body 14, both of which are typically made from molded plastic, but may be made from other materials. Rivet shaft 12 includes head 16 with upwardly arching domed screw-type upper surface 18 with a Phillips-head slot configuration 20 (see FIG. 7). Head 16 further includes, on lower surface 22, ramped surface 24 which extends upwardly in the counterclockwise direction ("counterclockwise" referring to a direction of rotation when viewing head 16 from above in the orientation shown in FIG. 1) and vertical sheer face 26. Vertical sheer face 26 extends from a circumferential location on shank 30 to a circumferential location on head 16. That is, vertical sheer face 26 is not radially oriented with respect to shank 30. A second vertical sheer face (not shown) is offset 180° around the circumference of head 16 from vertical sheer face 26. Likewise, a second ramped surface (not shown) is offset 180° around the circumference of head 16 from ramped surface 24. As will be explained hereinafter, ramped surface 24 and vertical sheer face 26, along with complementary surfaces on rivet body 14, provide an intuitive basis for the user to disengage or uninstall rivet 10.

Rivet shaft 12 further includes shank 30 which extends downwardly from head 16. Shank 30 terminates in oval boss 34. The cross section of oval boss 34 is shown in FIG. 3. The length of major axis 36 of oval boss 34 is the width of oval boss as shown in FIG. 1 while the length of minor axis 38 of oval boss 34 is the width of oval boss 34 as shown in FIG. 2. As shown in FIG. 1, lower barbs 40 are formed by lower undercuts 42 immediately upward from tip 44 of oval boss 34. Flared walls 46 extend upwardly and outwardly from lower undercuts 42 thereby forming upper barbs 48 and upper undercuts 50.

Shank 30 further includes pre-installation boss 31 at an intermediate location thereon. As will be explained hereinafter, pre-installation boss 31 is a protrusion which is used to attach rivet shaft 12 to rivet body 14 in a pre-installed or pre-driven state (such as shown in FIG. 8) in order to allow rivet 10 to be shipped as a single unit.

Rivet body 14 includes circular flange 54 from which expandable arms 56, 58 downwardly extend. Expandable arms 56, 58 include vertical inner walls 60, 62 which join inwardly extending inner walls 64, 66, respectively. As shown in FIG. 5, vertical inner walls 60, 62 include cam grooves 68, 70 which are substantially parallel to each other, the respective apices 71, 72 of which are separated by a distance to allow for the passage therebetween of the major axis 36 of oval boss 34. However, vertical inner walls 64, 66 are separated by a distance to allow for the passage therebetween of the minor axis 38 of oval boss 34.

As shown in FIG. 6, inwardly extending inner walls 64, 66 a likewise include cam grooves 73, 74 which are contiguous with cam grooves 68, 70, respectively, but which extend downwardly toward each other. This provides for the expandable characteristics of arms 56, 58.

The lower ends 75, 76 of expandable arms 56, 58 connect to guide portions 77, 78 via hinge portions 79, 80. Guide portions 77, 78 join each other at tip 81.

Referring now to FIG. 4, one sees that circular flange 54 includes countersunk nest 82 including oval aperture 83 with major and minor axes 84, 85 sized to allow oval boss 34 to align therewith and pass therethrough. Moreover, tips 86, 87 of oval aperture 83 along major axis 84 are contiguous with cam grooves 68, 70 of inner walls 64, 66 of expandable arms 56, 58 in order to guide oval boss 35 into cam grooves 68, 70.

Countersunk nest 82 further includes ramped surfaces 88, 89 and vertical sheer faces 90, 91 are positioned to engage complementary ramped surfaces 24 and vertical sheer faces 26 of rivet shaft 12 when rivet 10 is in the installed position of FIG. 9. Moreover, this configuration resists relative clockwise rotation of the rivet shaft 12 in the installed position of FIG. 9 and provides for the rivet shaft 12 to be lifted from the engaged or installed position by a quarter turn of rivet shaft 12. Additionally, if rivet shaft 12 is over-rotated (i.e., a total rotation of 180°) from the installed position, then this configuration will allow the rivet shaft 12 to fall back into the installed position.

The operation of rivet 10 will now be explained with reference to FIGS. 8–11.

FIG. 8 shows that immediately prior to installation, oval boss 34 of rivet head 12 can freely pass through oval aperture 83 of countersunk nest 82 and into cam grooves 68, 70 of inner walls 60, 62 of expandable arms 56, 58 of rivet body 14. Pre-installation boss 31 of shank 30 can engage rivet body 14 to engage rivet head 12 and rivet body 14 so that rivet 10 can be shipped as a single unit.

FIG. 9 shows that installation proceeds with expandable arms 56, 58 being urged by the installer through apertures 102, 106 of panels 100, 104, respectively, which are to be joined together by rivet 10. Circular flange 54 is urged flush against panel 100. Rivet head 12 is manually pushed downward by the installer so that oval boss 34 passes into cam grooves 73, 74 of inwardly extending inner walls 64, 66 of expandable arms 56, 58. This forces expandable arms 56, 58 apart into the engaged or installed position of FIG. 9. The ramped surface 24 and vertical sheer face 26 (along with the similar elements rotated 180° therefrom) of head 16 align with the ramped surfaces 88, 89 and vertical sheer faces 90, 91 of countersunk nest 82. Additionally, lower barbs 40 of shank 30 proximate to oval boss 34 detent engage lower ends 75, 76 of expandable arms 56, 58 and flared walls 46 formed between lower and upper barbs 40, 48 of shank 30 are flush with cam grooves 73, 74 of inwardly extending inner walls 64, 66 of expandable arms 56, 58. Lower barbs 40 cause a clicking sound while detent engaging lower ends 75, 76 of expandable arms 56, 58.

To uninstall rivet 10 during servicing, the user engages a Phillips-head screwdriver against Phillips-head slot configuration 20 of head 16 and turns head 16 counterclockwise by ninety degrees. The interaction of the ramped surfaces 24, 88, 89 forces the rivet shaft 12 upwardly giving the user a "feel" of release. This upward motion along with the rotation of rivet shaft 12 disengages lower barbs 40 from lower ends 75, 76 of expandable arms 56, 58. This disengagement releases the pressure of the lower barbs 40 thereby causing a clicking sound further providing an intuitive signal to the user as to the operation of rivet 10. The expandable arms 56, 58 then collapse or contract inwardly toward the original position of arms 56, 58 prior to installation. This results in the position illustrated in FIG. 10. The interference angle between the inwardly extending inner walls 64, 66 and shank 30 allow only one point of contact, thereby assisting in the ejection of head 16. As the head 16 is ejected upwardly as shown in FIG. 10, it is obvious to the user that the rivet 10 is uninstalled or disconnected.

If the user continues to rotate rivet shaft 12 by a total of 180°, either intentionally or unintentionally, while maintaining pressure on head 16, rivet shaft 12 could re-engage in the installed position of FIG. 9. This re-engagement is accompanied by a sharp fall-off of the head 16 with respect to the rivet body 14 along vertical sheer faces 26, 90, 91 thereby causing a clicking sound. This helps the user intuitively understand that rivet 10 is operated with a one-quarter turn.

Head 16 resists rotation in the clockwise direction when in the installed position of FIG. 9 due to the alignment of vertical sheer face 26 of head 16 and vertical sheer faces 90, 91 of countersunk nest 82.

Figure 10:
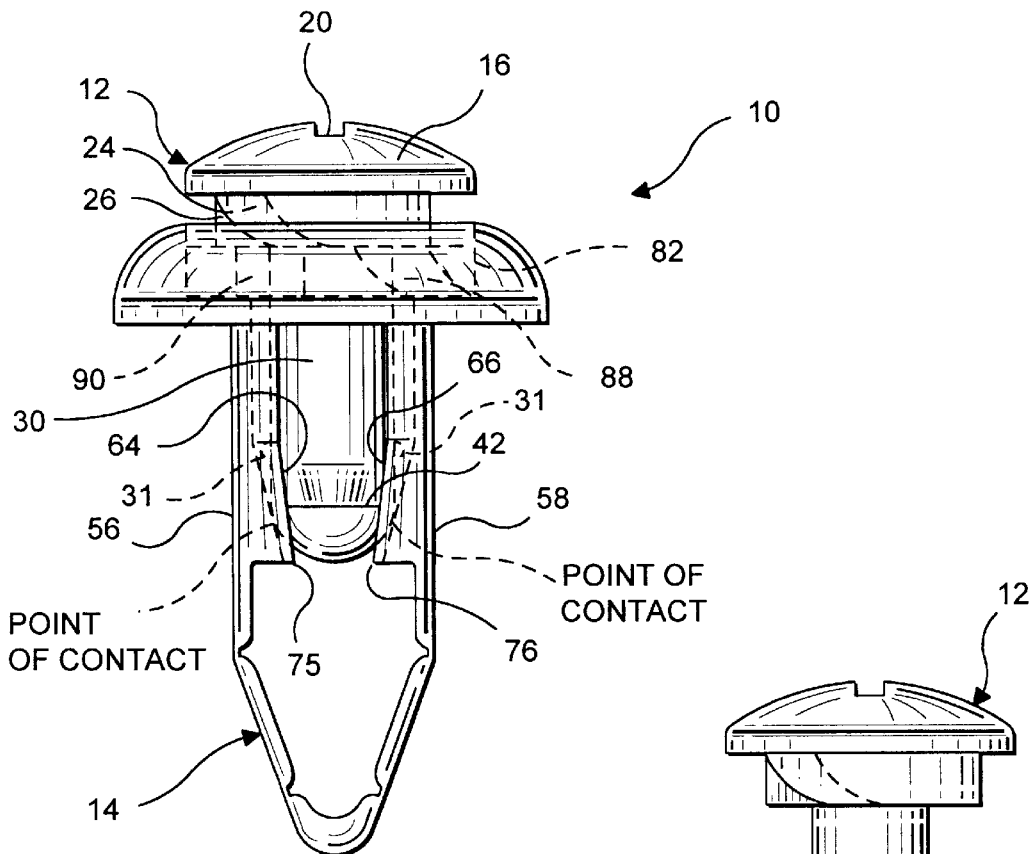
FIG. 10 is a side plan view of the rivet of the present invention in the uninstalled position, achieved by rotating the shaft subsequent to installation.
Figure 11:
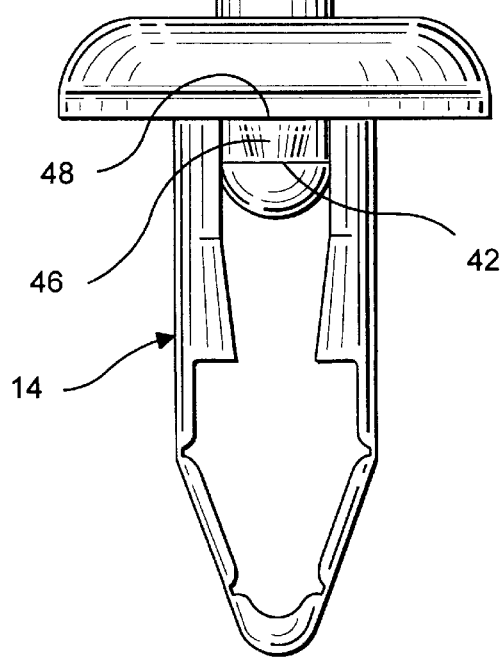
FIG. 11 is a side plan view of the rivet of the present invention in the uninstalled position, achieved by rotating the shaft subsequent to installation, and then raising the shaft wherein the oval boss and the oval aperture are not aligned, therefore preventing the shaft from separating from the body.

When the rivet shaft 12 has been rotated so that the major axis 36 of boss 34 is rotated 90 degrees out of alignment with major axis 84 of oval aperture 83 as in FIGS. 10 and 11, the rivet shaft 12 is trapped within rivet body 14. This entrapment allows the user to grasp rivet shaft 12 and pull both rivet shaft 12 and rivet body 14 out of apertures 102, 106 as shown in FIG. 11. Rivet 10 can subsequently be inserted into the same or different apertures. The user can then use a screwdriver to maintain pressure on head 16 and rotate rivet shaft by 90 degrees clockwise so that oval boss 34 causes a cam action to spread expandable arms 56, 58. Oval boss 34 then returns to and locks into the position illustrated in FIG. 9. During rotation of head 16 while head 16 is being urged toward rivet body 14, ramped surface 24, 88, 89 provide counterrotation of rivet body 14 with respect to head 16. When oval boss 34 returns to the position illustrated in FIG. 9 after being rotated clockwise from the position shown in FIG. 10, the sheer vertical faces 26, 90, 91 align so as to prevent over-rotation and to urge the rivet shaft and rivet body 14 to engage fully, instead of the rivet body spinning within the apertures 102, 106.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A rivet comprising:
   a rivet shaft including a shank with a first end and a second end, a head on said first end of said shank, a boss on said second end of said shank, wherein said boss has a first portion of greater width and a second portion of lesser width;
   a rivet body including a flange with expandable arms extending therefrom, and an aperture in said flange between said expandable arms, said aperture receiving said shank and guiding said boss between said expandable arms;
   wherein when said shank is inserted into said aperture and said portion of greater width of said boss is positioned to contact said expandable arms, said expandable arms expand to an installed position, and wherein said shank is inserted into said aperture and said portion of lesser width of said boss is positioned to contact said expandable arms, said expandable arms contract to an uninstalled position; and wherein said shank includes at least one detent protrusion adjacent to said boss for engaging said expandable arms in said installed position, and wherein said at least one detent protrusion releases from said expandable arms in said uninstalled position.

2. The rivet of claim 1 wherein said boss has an oval cross section, wherein said portion of greater width is a major axis of said oval cross section and wherein said portion of lesser width is a minor axis of said oval cross section.

3. The rivet of claim 2 wherein said aperture is oval shaped to receive said boss of said oval cross section.

4. The rivet of claim 3 wherein said head is rotated one quarter turn between said installed position and said uninstalled position.

5. The rivet of claim 4 wherein said oval boss is inserted through said oval aperture and said rivet shaft is subsequently urged into said rivet body to achieve said installed position free of rotation of said rivet shaft.

6. The rivet of claim 5 wherein said oval aperture has an aperture major axis and an aperture minor axis and wherein cam grooves are in communication with ends of said oval aperture intersecting said aperture major axis.

7. The rivet of claim 6 wherein said oval boss can pass through said oval aperture only when said major axis of said boss is substantially aligned with said aperture major axis.

8. The rivet of claim 7 wherein inner surfaces of said expandable arms include cam grooves for receiving said portion of greater width of said oval boss.

9. The rivet of claim 8 wherein an underside of said head includes first ramped surfaces and first vertical sheer walls and said circular flange includes complementary second ramped surfaces and second vertical sheer walls outwardly adjacent from said aperture.

10. The rivet of claim 9 wherein said first vertical sheer walls engage said second vertical sheer walls in said installed position to inhibit relative rotation of said head in a first rotational direction and to urge said head outwardly from said circular flange when said head is relatively rotated in a second rotational direction.

11. The rivet of claim 10 wherein said first rotational direction is clockwise and said second rotational direction is counterclockwise.

12. The rivet of claim 11 wherein said first and second ramped surfaces effect counterrotation of said rivet body when said rivet head is rotated and said rivet head is urged toward said rivet body.

13. The rivet of claim 12 wherein said expandable arms include a first portion orthogonal to said circular flange and a second inwardly extending portion terminating in a surface for engaging said detent protrusion.

14. The rivet of claim 13 wherein said detent protrusion is formed by an undercut in said shank.

15. The rivet of claim 14 wherein ends of said expandable arms include living hinges which attach to guide portions, said guide portions being attached to each other to form a tip of said rivet body.

16. The rivet of claim 15 wherein said shank further includes a laterally positioned boss for engaging said rivet body in said uninstalled position.

17. The rivet of claim 16 wherein said head includes grooves for receiving a head of a screwdriver.

* * * * *